United States Patent
Ono (10) Patent No.: US 8,159,554 B2
(45) Date of Patent: Apr. 17, 2012

(54) IMAGE PROCESSING APPARATUS, IMAGE PROCESSING METHOD, IMAGE CAPTURING APPARATUS, AND MEDIUM STORING A PROGRAM FOR PROCESSING AN IMAGE BASED ON SPREAD OF LIGHT

(75) Inventor: Shuji Ono, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 540 days.

(21) Appl. No.: 12/364,919

(22) Filed: Feb. 3, 2009

(65) Prior Publication Data

US 2009/0201386 A1    Aug. 13, 2009

(30) Foreign Application Priority Data

Feb. 4, 2008   (JP) .................................. 2008-023795
Jan. 16, 2009  (JP) .................................. 2009-008056

(51) Int. Cl.
*H04N 5/228* (2006.01)

(52) U.S. Cl. ..................................... 348/222.1; 348/251

(58) Field of Classification Search ............... 348/222.1, 348/251, 252, 335
See application file for complete search history.

(56) References Cited

U.S. PATENT DOCUMENTS

| 2005/0206966 A1* | 9/2005 | Kakumitsu | 358/461 |
| 2005/0270391 A1* | 12/2005 | Watanabe | 348/294 |
| 2006/0126081 A1* | 6/2006 | Watanabe et al. | 358/1.2 |
| 2009/0201417 A1* | 8/2009 | Kasahara | 348/446 |
| 2010/0053469 A1* | 3/2010 | Choi | 348/734 |

FOREIGN PATENT DOCUMENTS

| JP | 2006-519527 A | 8/2006 |
| JP | 2006-523330 A | 10/2006 |

* cited by examiner

Primary Examiner — Gevell Selby
(74) Attorney, Agent, or Firm — Sughrue Mion, PLLC (57) ABSTRACT

Provided is an image processing apparatus, comprising an image generating section that generates a converted image by performing a coordinate conversion on a captured image captured through an optical system, such that a spread of light from the optical system has a shape that is spatially substantially uniform; a correcting section that corrects the converted image based on the spread of the light modified by the image generating section to have the shape that is substantially uniform; and an inverse converting section that performs an inverse conversion of the coordinate conversion on the converted image corrected by the correcting section.

14 Claims, 11 Drawing Sheets

IMAGE PROCESSING APPARATUS, IMAGE PROCESSING METHOD, IMAGE CAPTURING APPARATUS, AND MEDIUM STORING A PROGRAM FOR PROCESSING AN IMAGE BASED ON SPREAD OF LIGHT

CROSS REFERENCE TO RELATED APPLICATION

The present application claims priority from Japanese Patent Applications No. 2008-023795 filed on Feb. 4, 2008 and No. 2009-008056 filed on Jan. 16, 2009, the contents of which are incorporated herein by reference.

BACKGROUND

1. Technical Field

The present invention relates to an image processing apparatus, an image processing method, an image capturing apparatus, and a computer readable medium storing thereon a program. In particular, the present invention relates to an image processing apparatus and an image processing method for processing a captured image, an image capturing apparatus for capturing an image, and a computer readable medium storing thereon a program used by the image processing apparatus and the image capturing apparatus.

2. Related Art

A camera provided with an objective lens having a PSF two times greater than the pitch of the light receiving element array is known as in, for example, Japanese Unexamined Patent Application Publication No. 2006-519527. Furthermore, a technique for causing an optical transfer constant of optical imaging to be substantially constant in relation to the aberrations concerning the focal point by using optical elements that change a phase of a wave surface is known as in, for example, Japanese Unexamined Patent Application Publication No. 2006-523330.

It is easy for the PSF shape of the light from an object to change if the object is on an axis or removed from an axis. Accordingly, when the processes disclosed in the above patent documents are employed to restore an entire image region using the same filter, an artifact may arise depending on the region. Furthermore, the restoration may be performed using a filter with different restoration characteristics for different image regions, but switching the filter for each region increases the computation time of the restoration process.

SUMMARY

Therefore, it is an object of an aspect of the innovations herein to provide an image processing apparatus, an image processing method, an image capturing apparatus, and a medium storing thereon a program, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary apparatus may include an image processing apparatus comprising an image generating section that generates a converted image by performing a coordinate conversion on a captured image captured through an optical system, such that a spread of light from the optical system has a shape that is spatially substantially uniform; a correcting section that corrects the converted image based on the spread of the light modified by the image generating section to have the shape that is substantially uniform; and an inverse converting section that performs an inverse conversion of the coordinate conversion on the converted image corrected by the correcting section.

According to a second aspect related to the innovations herein, one exemplary method may include an image processing method comprising generating a converted image by performing a coordinate conversion on a captured image captured through an optical system, such that a spread of light from the optical system is modified to have a shape that is spatially substantially uniform; correcting the converted image based on the spread of the light modified to have a shape that is substantially uniform; and performing an inverse conversion of the coordinate conversion on the corrected converted image.

According to a third aspect related to the innovations herein, one exemplary storage medium may include a computer readable medium storing thereon a program used by an image processing apparatus, the program causing a computer to function as an image generating section that generates a converted image by performing a coordinate conversion on a captured image captured through an optical system, such that a spread of light from the optical system has a shape that is spatially substantially uniform; a correcting section that corrects the converted image based on the spread of the light modified to have a shape that is substantially uniform; and an inverse converting section that performs an inverse conversion of the coordinate conversion on the converted image corrected by the correcting section.

According to a fourth aspect related to the innovations herein, one exemplary apparatus may include an image capturing apparatus comprising an optical system that forms an image with light and that causes a spread of light from object points at different positions to have different shapes on an image surface; an image generating section that generates a converted image by performing a coordinate conversion on a captured image captured through the optical system, such that the spread of the light form the optical system has a shape that is spatially substantially uniform; a correcting section that corrects the converted image based on the spread of the light modified to have the shape that is substantially uniform; and an inverse converting section that performs an inverse conversion of the coordinate conversion on the converted image corrected by the correcting section.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
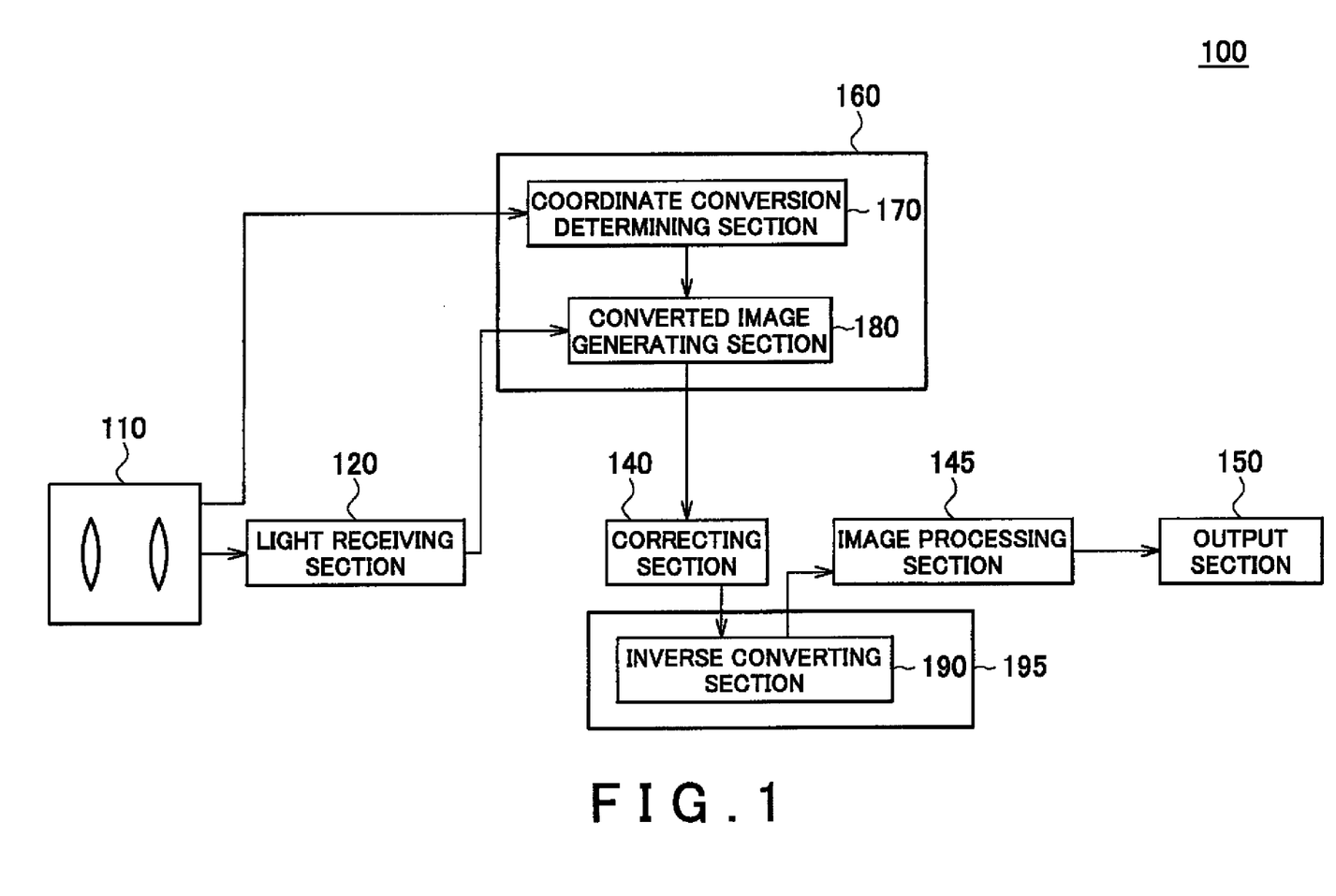
FIG. 1 shows an exemplary block configuration of an image capturing apparatus 100 according to an embodiment of the present invention.

FIG. 1 shows an exemplary block configuration of an image capturing apparatus 100 according to an embodiment of the present invention. The image capturing apparatus 100 captures an image of a subject to generate an image. The image capturing apparatus 100 is provided with a lens system 110 that serves as an example of an optical system focusing light, a light receiving section 120 that receives the light passed through the lens system 110, an image generating section 160, a correcting section 140, an image converting section 195, an image processing section 145, and an output section 150. The image generating section 160 includes a coordinate conversion determining section 170 and a converted image generating section 180. The image converting section 195 includes an inverse converting section 190. The function blocks representing the image generating section 160, the correcting section 140, the inverse converting section 190, the image processing section 145, and the output section 150 can function together as the image processing apparatus of the present invention.

The lens system 110 spreads light from object points that form an image near a single image point, such that the shape of the spread light is substantially the same regardless of the distance to the object points, thereby causing the optical transfer function to be substantially the same for the light from the object points that form images near the same image point. The shape of the light spread from the object points by the lens system 110 may be different depending on the image point. An optical characteristic of the lens system 110 is qualitatively described in relation to FIG. 2.

The light receiving section 120 includes a plurality of light receiving elements that are arranged 2-dimensionally. The image generating section 160 generates a converted image expressed in a coordinate system that is different from an image expressed in a prescribed coordinate system, by A/D converting the amount of light received by each light receiving element and applying a coordinate conversion to the resulting captured image. More specifically, the converted image generating section 180 generates the converted image by performing a coordinate conversion, on the image captured through the lens system 110, that modifies the spread of the light by the lens system 110 to have a substantially uniform spatial shape.

More specifically, the coordinate conversion determining section 170 determines the coordinate conversion such that, after the conversion is performed, the shape of the light spread by the lens system 110 is substantially uniform. The coordinate conversion determining section 170 may acquire information from the lens system 110 that indicates an optical characteristic of the lens, and may perform the determined coordinate conversion based on the acquired information. The converted image generating section 180 generates the converted image, which is different from the captured image, by using the coordinate conversion determining section 170 to perform the determined coordinate conversion. In this way, the coordinate conversion determining section 170 determines a coordinate conversion by which the light spread by the lens system 110 is modified to have a substantially uniform spatial shape, for each of a plurality of partial regions in the captured image. The converted image generating section 180 then generates a converted image for each of the partial regions in the captured image by using the coordinate conversion determining section 170 to perform the determined coordinate conversion.

The correcting section 140 corrects the converted images based on the optical transfer function of the lens system 110. For example, the correcting section 140 corrects the converted images based on the spread of the light modified to have a substantially uniform shape. The inverse converting section 190 applies an inverse conversion of the coordinate conversion to the converted images corrected by the correcting section 140. In this way, the display format of the image is returned to its original coordinate system. The image that is inverse converted by the inverse converting section 190 is supplied to the image processing section 145.

The image processing section 145 performs image processing on the image supplied from the inverse converting section 190. The image processing performed by the image processing section 145 may be a color balancing process, a γ conversion, a color synchronizing process, an edge correction process, a color correction process, or the like. In this way, the image processing section 145 can convert the pixel values of the converted image corrected by the correcting section 140 to values that are non-linear with respect to the amount of light received by the light receiving elements.

The output section 150 outputs an output image acquired as a result of the processes performed by the correcting section 140 and the image processing section 145. For example, the output section 150 may display the output image. As other examples, the output section 150 may instead store the output image on a recording medium, send the output image to a communication circuit, or compress the output image before output.

Figure 2:
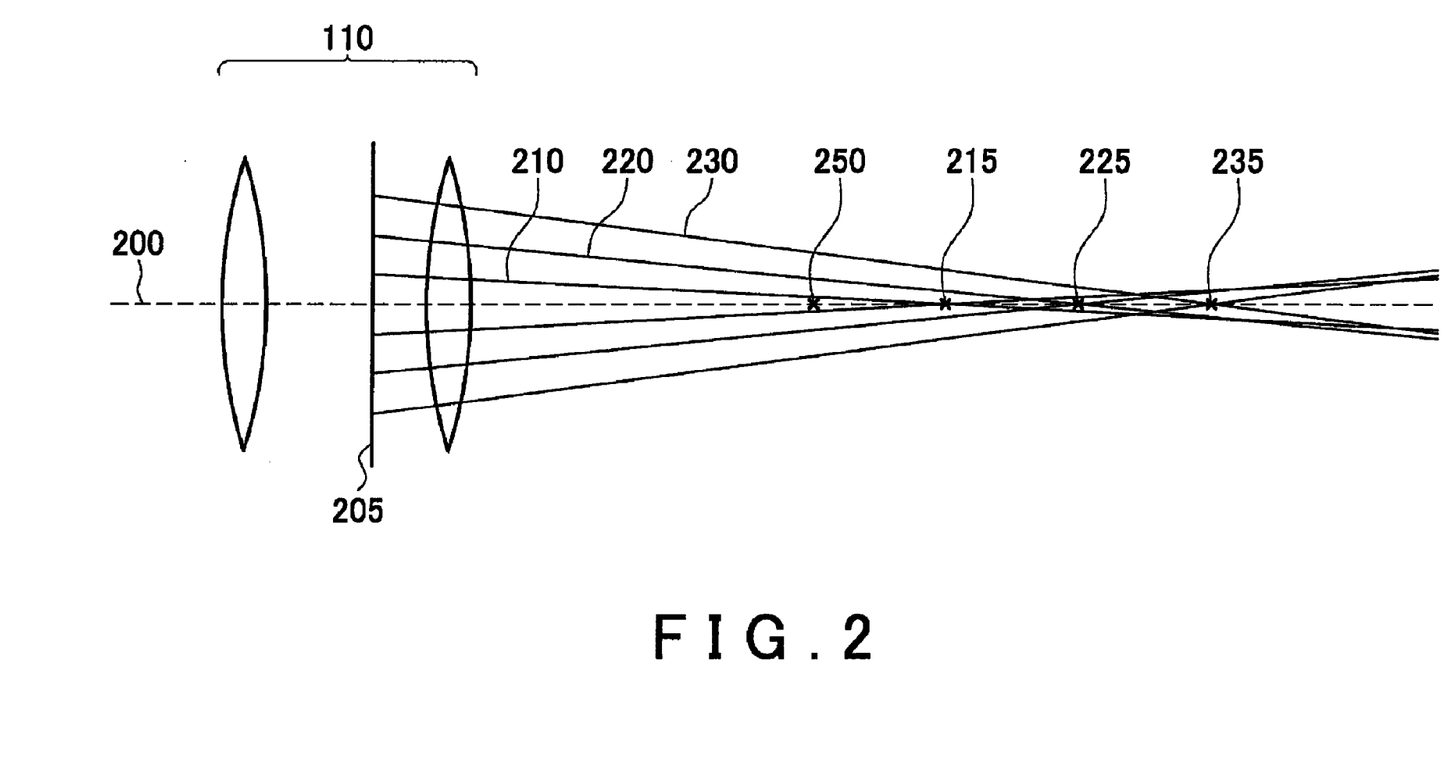
FIG. 2 shows a schematic example of an optical characteristic of the lens system 110.

FIG. 2 shows a schematic example of an optical characteristic of the lens system 110. FIG. 2 shows trajectories of three light rays 210, 220, and 230 that are incident to different positions on the optical axis 200 of the entrance pupil 205. These light rays are among a plurality of light rays incident to the lens system 110 from the object point on the optical axis. As shown in FIG. 2, the light ray 210, the light ray 220, and the light ray 230 are incident to a position near the optical axis 200 of the entrance pupil 205 in the stated order.

As shown in FIG. 2, the light ray 210 passes through the lens system 110 to cross the optical axis 200 at the position 215 that is further from the lens system 110 in a direction of the optical axis than the paraxial focal point at the position 250. The light ray 230, which is incident to the lens system 110 at a position furthest from the optical axis 200, passes through the lens system 110 to cross the optical axis 200 at the position 235 that is further from the lens system 110 in a direction of the optical axis than the position 215. The light ray 220 passes through the lens system 110 to cross the optical axis 200 at the position 225 between the position 215 and the position 235.

As shown in FIG. 2, the size of the light spread caused by the lens system 110 is expected to be substantially equal between position 215 and position 235. As a result, the lens system 110 has an overcorrected spherical aberration, so that the light forms an image substantially far from the position 250 of the paraxial focal point. The overcorrection of the spherical aberration enables the lens system 110 to lengthen the distance in the direction of the optical axis over which the size of the light spread from the object point remains substantially uniform, regardless of the position of the image surface in the direction of the optical axis.

When this distance is lengthened in the direction of the optical axis in this way, image positions at which the size of the light spread remains substantially uniform exist for light from an object point in a wider range of distances from the lens system 110. When the light receiving section 120 is disposed at such an image surface position, the optical transfer function at the position where the light receiving section 120 is disposed remains substantially uniform regardless of the distance from the object point. Therefore, due to the aberration characteristic described above, the lens system 110 can cause the optical transfer function in relation to the light from the object point to remain substantially uniform regardless of the distance from the object point.

FIG. 2 is used above to qualitatively describe the optical characteristic of the lens system 110. The schematic diagram of the lens system 110 shown in FIG. 2 merely illustrates the optical characteristic of the lens system 110, and is not drawn to scale.

Figure 3:
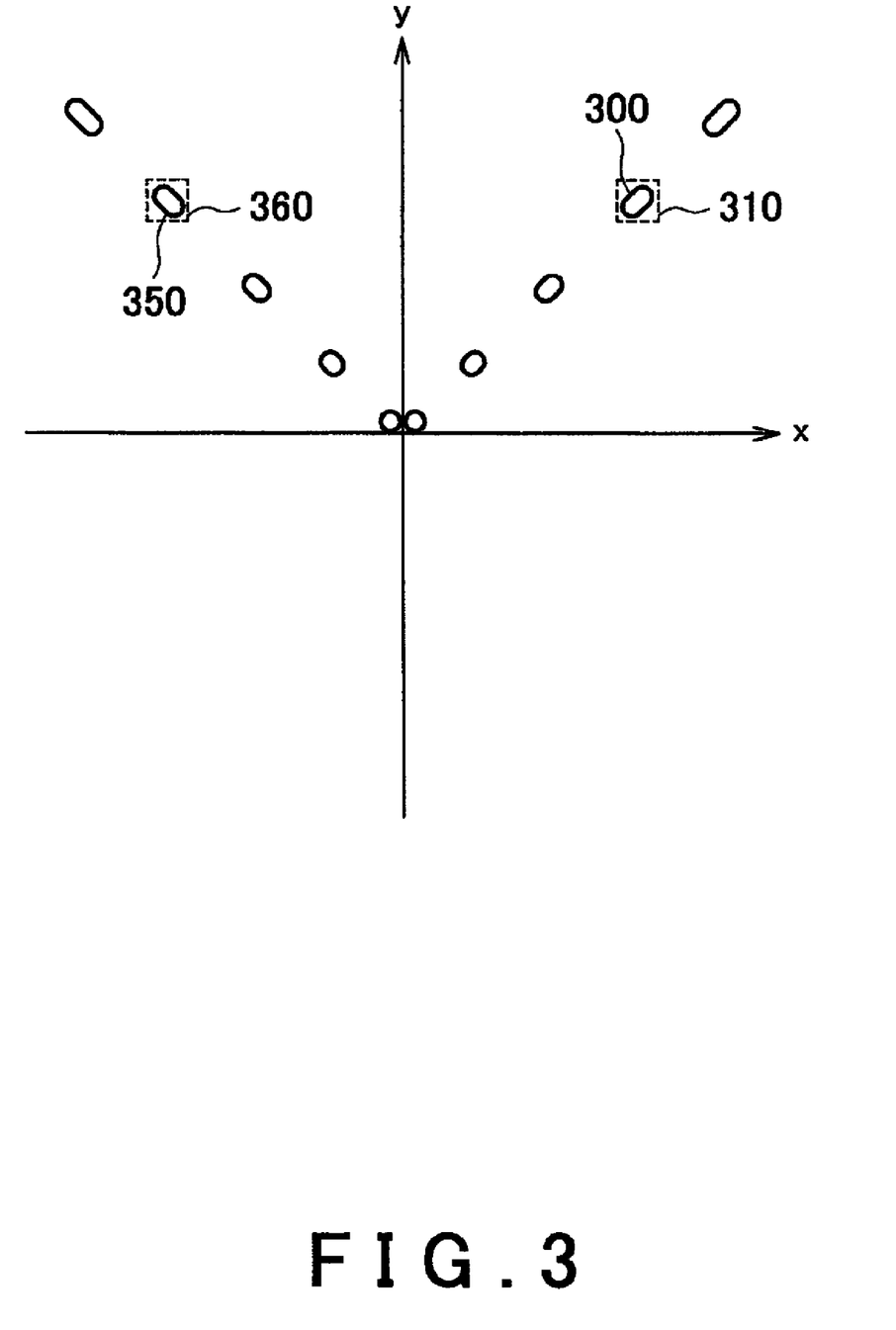
FIG. 3 shows the form of the light from the object point spread by the lens system 110.

FIG. 3 shows the form of the light from the object point spread by the lens system 110. FIG. 3 shows an example of spread in a Cartesian coordinate system. The taller the image, the larger the light spread, and the shape of the spread is usually symmetric around a point of origin. Therefore, if an inverse filter according to the shape of the spread at each position of the image surface is not used, it is impossible to accurately correct the optical response to the optical transfer function.

For example, the elliptical spread shown by the numeral 300 and the elliptical spread shown by the numeral 350 have different orientations relative to the longitudinal axis. Accordingly, when an inverse filtering process using the pixels in prescribed pixel blocks 310 and 360 is applied, a correction error arises due to the difference in the longitudinal orientation. Therefore, even for images at the same height, it is essential that a different reverse filter be used according to the position on the image surface. If the image height is different, the size of the spread is also different, and therefore the correction error is likely to be even larger. Such an error might appear as an artifact in the corrected image.

Figure 4:
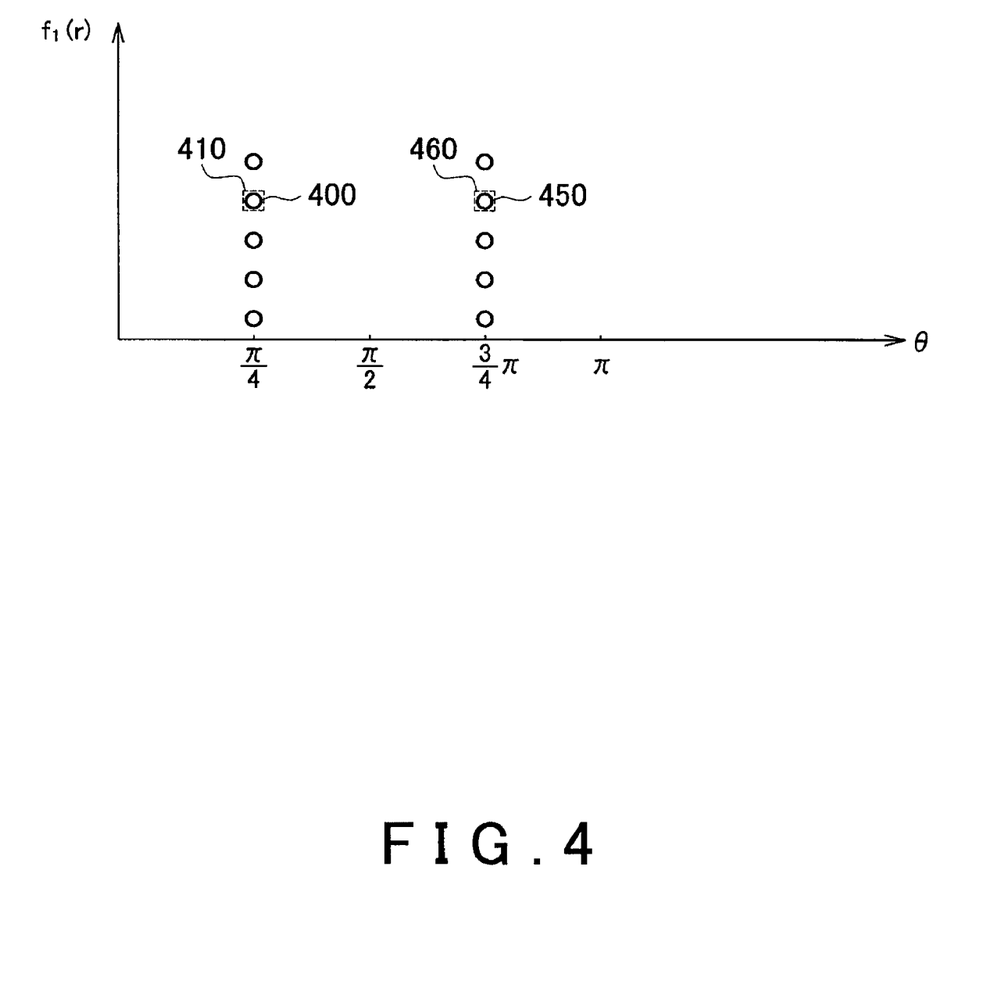
FIG. 4 shows the light spread after the coordinate conversion.

FIG. 4 shows the light spread after the coordinate conversion. In FIG. 4, the shape of the light spread is expressed in a rotary coordinate system, which is an example of the coordinate conversion. The radial direction r is converted using a prescribed function $f_1(r)$ according to a characteristic of the light spread by the lens system 110. This prescribed function is exemplified by a logarithmic function, but any function based on the optical characteristic of the lens system 110 can be selected.

As shown in FIG. 4, the coordinate conversion causes the shape of the light spread shown by the numeral 400 and the shape of the light spread shown by the numeral 450 to be substantially uniform in the radial direction and the θ direction. Accordingly, the correcting section 140 can perform the correction process using the pixel values in pixel blocks having the same size and same shape, such as the pixel blocks shown by numeral 410 and numeral 460. Therefore, even if the same reverse filtering process is applied to all surfaces of the converted image, the correcting section 140 can restore the subject image more accurately than if no coordinate conversion were performed.

Figure 5:
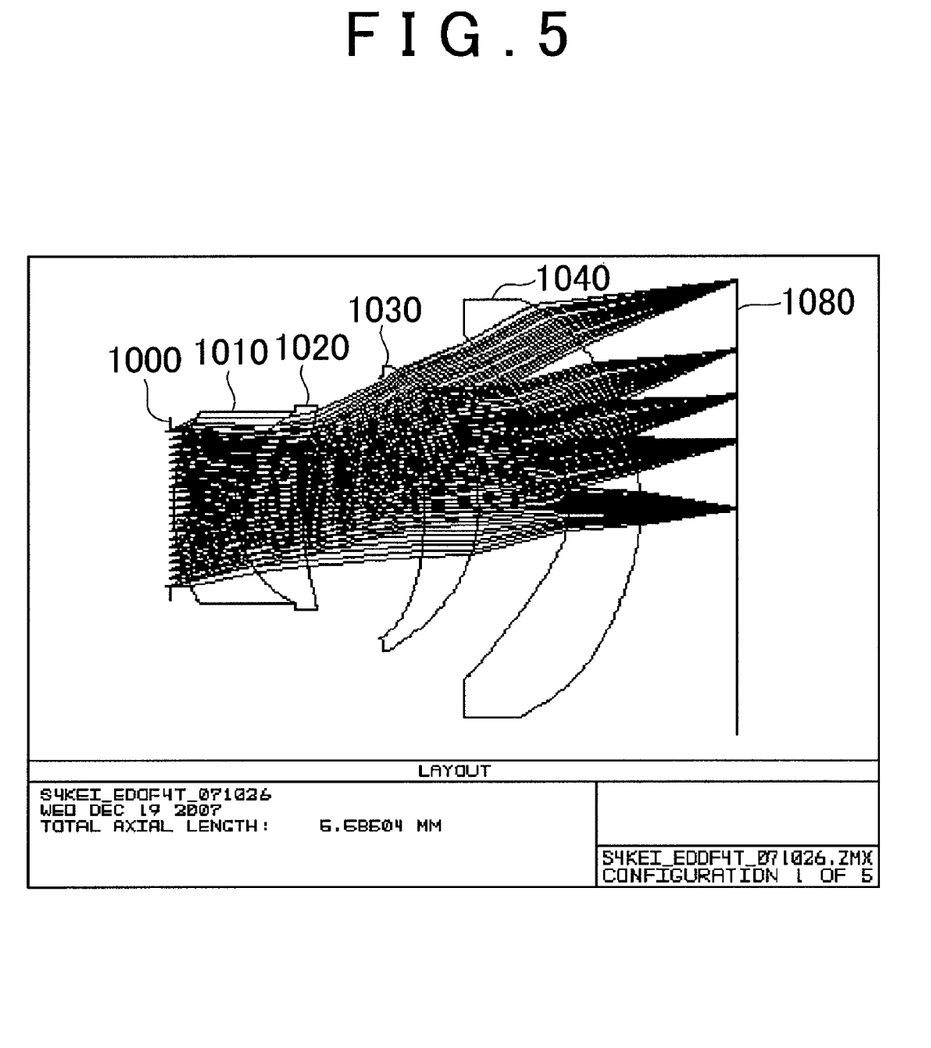
FIG. 5 shows an exemplary configuration of the lens system 110.

FIG. 5 shows an exemplary configuration of the lens system 110. The lens system 110 includes a diaphragm 1000, a lens 1010, a lens 1020, a lens 1030, and a lens 1040. The image surface is represented by the numeral 1080. FIG. 5 shows a plurality of light rays overlapping in the lens system 110. The following describes the arrangement and optical characteristics of the lenses 1010, 1020, 1030, and 1040.

The refractive index of the lens 1010 is 1.75252013, 1.73626547, and 1.72960919 respectively for light having a wavelength of 486.100 nm, 587.600 nm, and 656.300 nm. The refractive index of the lens 1020 is 1.57943754, 1.57249816, and 1.56948554 respectively for light having a wavelength of 486.100 nm, 587.600 nm, and 656.300 nm. The refractive index of the lens 1030 is 1.72222289, 1.71300056, and 1.70897250 respectively for light having a wavelength of 486.100 nm, 587.600 nm, and 656.300 nm. The refractive index of the lens 1040 is 1.54625510, 1.53995831, and 1.53720821 respectively for light having a wavelength of 486.100 nm, 587.600 nm, and 656.300 nm.

The diaphragm 1000 is disposed in a position 0.025 mm from the lens 1010 in a direction of the object. The width of the lens 1010 is 0.6048451 mm. The width described in FIG. 5 refers to the length of the lens in a direction of the optical axis. The curvature radius of the object-side surface of the lens 1010 is 1.804827 mm, the cross-sectional radius of the object-side is 1.902386 mm, and the conical constant of the object-side surface is −16.12702. The curvature radius of the image-side surface of the lens 1010 is 1.062453 mm, the cross-sectional radius of the image-side is 1.908364 mm, and the conical constant of the image-side surface is 0. In FIG. 5, a negative curvature radius means that the surface is concave relative to the light.

The lens 1020 is disposed to contact the lens 1010, and has a width of 0.6671067 mm. The object-side surface of the lens 1020 contacts the entirety of the image-side surface of the lens 1010. The curvature radius of the image-side surface of the lens 1020 is 3.898539 mm, the cross-sectional radius of the image-side is 2.02948 mm, and the conical constant of the image-side surface is −15.29643.

The lens 1030 is disposed to be at a distance of 1.194403 mm in the direction of the image from the lens 1020. The lens 1030 has a thickness of 0.540456 mm. The curvature radius of the object-side surface of the lens 1030 is −4.258029 mm, the cross-sectional radius of the object-side is 2.644769 mm, and the conical constant of the object-side surface is 9.589968. The curvature radius of the image-side surface of the lens 1030 is −1.42228 mm, the cross-sectional radius of the image-side is 2.837309 mm, and the conical constant of the image-side surface is −1.367553.

The lens 1040 is disposed to be at a distance of 0.8969939 mm in the direction of the image from the lens 1030. The lens 1040 has a thickness of 0.7020744 mm. The curvature radius of the object-side surface of the lens 1040 is −0.8313313 mm, the cross-sectional radius of the object-side is 3.463307 mm, and the conical constant of the object-side surface is −2.169943. The curvature radius of the image-side surface of the lens 1040 is −1.810591 mm, the cross-sectional radius of the image-side is 4.156727 mm, and the conical constant of the image-side surface is −5.628916. The image surface is disposed a distance of 0.9541563 mm from the lens 1040 in the direction.

The lenses 1010, 1020, 1030, and 1040 are arranged with the center of each lens on the same axis, in the manner described above. Accordingly, the lens system 110 is rotationally symmetric with respect to the optical axis.

An absolute value of the difference between an angle of a line normal to the image surface and an angle of incidence of a chief ray to the image surface is less than a preset value, so that the calculation error in the optical transfer function of the lens system 110 is less than a preset value. In this way, the calculation error in the optical transfer function can be decreased by increasing the telecentricity of the lens system 110. For example, when calculating the MTF, an FFT can be used to calculate the MTF with a sufficiently small error. Therefore, it is possible to quickly restore the blurred image from the lens system 110 as a clear image.

Figure 6:
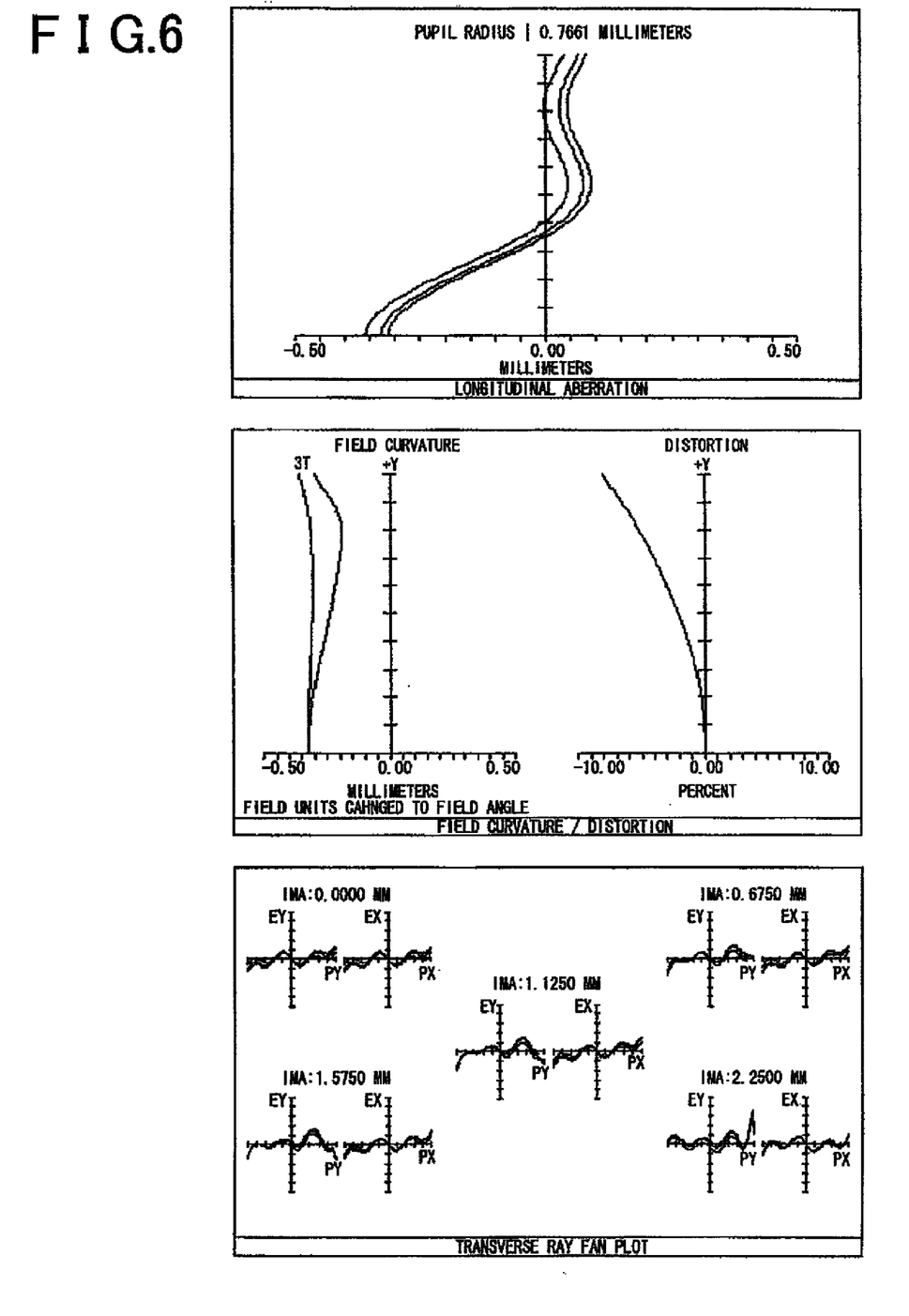
FIG. 6 shows aberration characteristics of the lens system 110 shown in FIG. 5.

FIG. 6 shows aberration characteristics of the lens system 110 shown in FIG. 5. FIG. 6 shows, in order from the top to bottom, a spherical aberration graph, an astigmatism graph and a distortion graph, and transverse aberration graphs. As shown by the uppermost curvature spherical graph, the curvature aberration of the lens system 110 shown in FIG. 5 is overcorrected. In this graph, the horizontal axis represents the position relative to the set image surface, but does not show the position relative to the paraxial focal point.

As shown in FIG. 6, the vertical aberration is positive over all surfaces of the image surface. The bottom of FIG. 6 shows a plurality of graphs of transverse aberrations in the image height. The graph in the upper left of this set shows a transverse aberration on the optical axis, and the graph in the upper right shows a transverse aberration at an image height of 0.6750 mm. The bottom left graph shows a transverse aberration at an image height of 1.5750 mm, the center graph shows a transverse aberration at an image height of 1.1250 mm, and the bottom right graph shows a transverse aberration at an image height of 2.2500 mm. As shown, the transverse aberrations of the lens system 110 have a substantially uniform shape at each image height.

Figure 7:
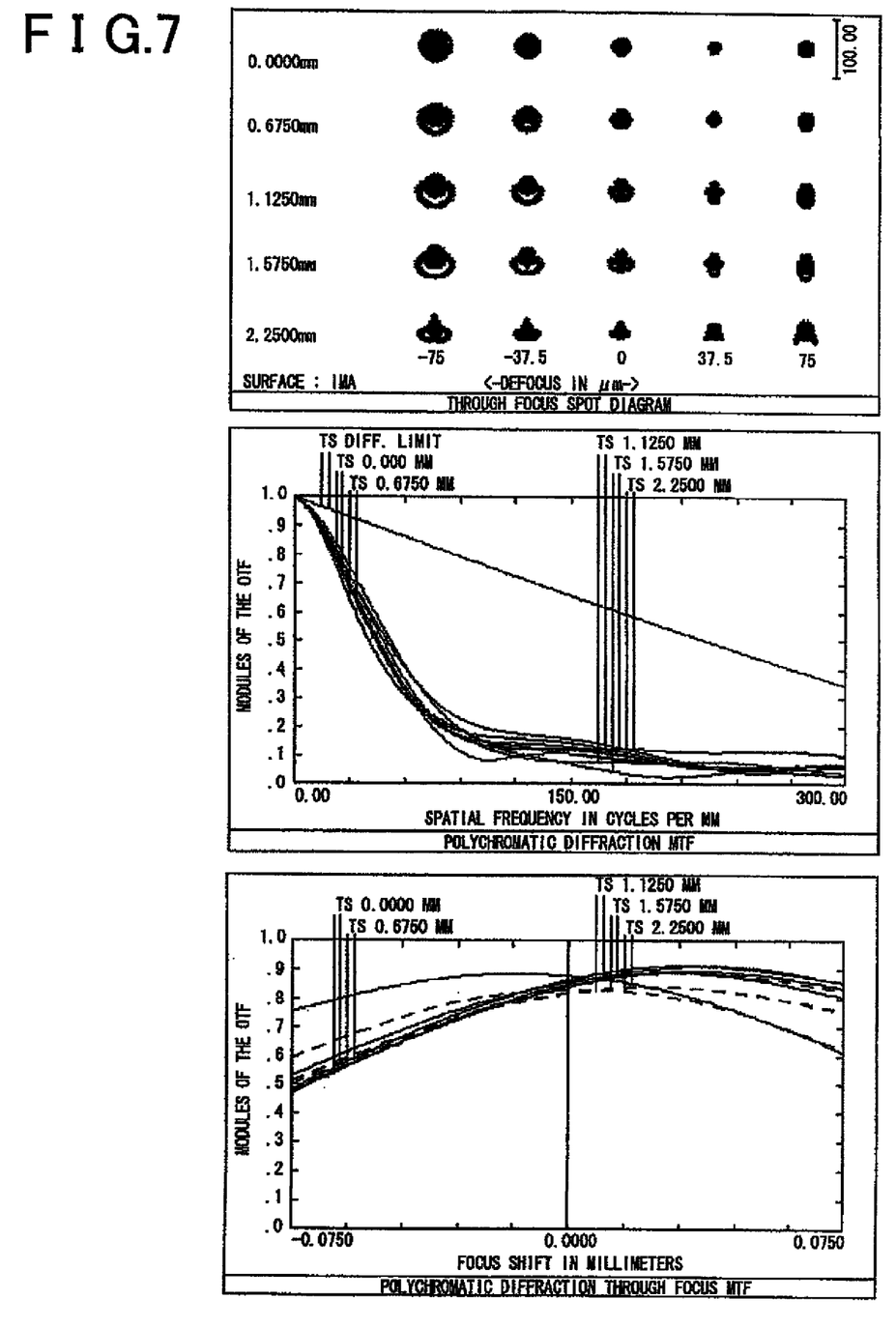
FIG. 7 shows optical transfer characteristics of the lens system 110 shown in FIG. 5.

FIG. 7 shows optical transfer characteristics of the lens system 110 shown in FIG. 5. FIG. 7 shows, from top to bottom, a spot diagram of image height and defocus dependency, a graph of the defocus dependency of the MTF, and a graph of the spatial frequency characteristics of the MTF.

The uppermost set of spot diagrams shows spot diagrams for a plurality of different image heights and defocus amounts. In this set of spot diagrams, spot diagrams at the same height but with different defocus amounts are lined up horizontally, and spot diagrams with the same defocus amount but different image heights are lined up vertically.

As shown by the image height displayed by the value to the left of each spot diagram row, this set includes spot diagrams at image heights of 0 mm, 0.6750 mm, 1.1250 mm, 1.5750 mm, and 2.2500 mm from the optical axis. As shown by the defocus amount displayed by the value below each spot diagram row, this set includes spot diagrams at positions that are −75 μm, −37.5 μm, 0 μm, 37.5 μm, and 75 μm from the set image surface.

As shown by the set of spot diagrams, the spread of each spot diagram can be treated as being substantially uniform over at least the image positions within a preset range in a direction of the optical axis. In this way, the light spread from the object point caused by the lens system 110 is substantially equal over the image positions within a preset range in a direction of the optical axis. The light spread may refer to the spread of the spot diagrams, as shown in FIG. 7, or may refer to the light spread represented by the point image distribution function.

As shown by the graph of the defocus dependency of the MTF in the middle of FIG. 7, sagittal rays and meridional rays have a substantially uniform distribution of MTF values. The MTF takes values that are substantially uniform within at least the range of defocus amounts shown by the graph. Therefore, the MTF of the lens system 110 takes substantially uniform values over a wide range of defocus values.

As shown by the graph of the spatial frequency characteristic of the MTF at the bottom of FIG. 7, the lens system 110 causes the sagittal rays and the meridional rays at the same image height to have substantially equal MTF frequency characteristics. The MTF of the lens system 110 can be thought of as being substantially uniform over a predetermined range of image position in the direction of the optical axis.

With reference to the spot diagrams, the shapes of the spot diagrams can be treated as being more or less equal regardless of image height, but a considerable difference still remains. For example, when considering the spot diagrams with a defocus amount of 0, the spot diagrams at image heights of 0 mm and 0.6750 mm have substantially the same circular shape and size. However, at greater image heights, the spot diagrams cannot be said to have the same circular shapes, though they do have shapes that loosely resemble each other. Therefore, the shapes of the light spread from the object point caused by the lens system 110 are different on the image surface.

Therefore, by using prescribed functions that scale radii centered on the optical axis with different scaling ratios for the range of image heights from 0 mm to 0.6750 mm and for image heights greater than this range, the shapes of the spot diagrams within a range of image heights from 0 mm to approximately 0.6750 mm are caused to be substantially the same, as are the spot diagrams within a range of image heights greater than 0.6750 mm. Since the lens system 110 is rotationally symmetric around the optical axis, it is expected that the shapes of the spot diagrams are also rotationally symmetric around the optical axis. Therefore, the shape of the light spread by the lens system 110 is different depending on the radius centered on the optical axis, but remains substantially constant over a direction of θ.

Figure 8:
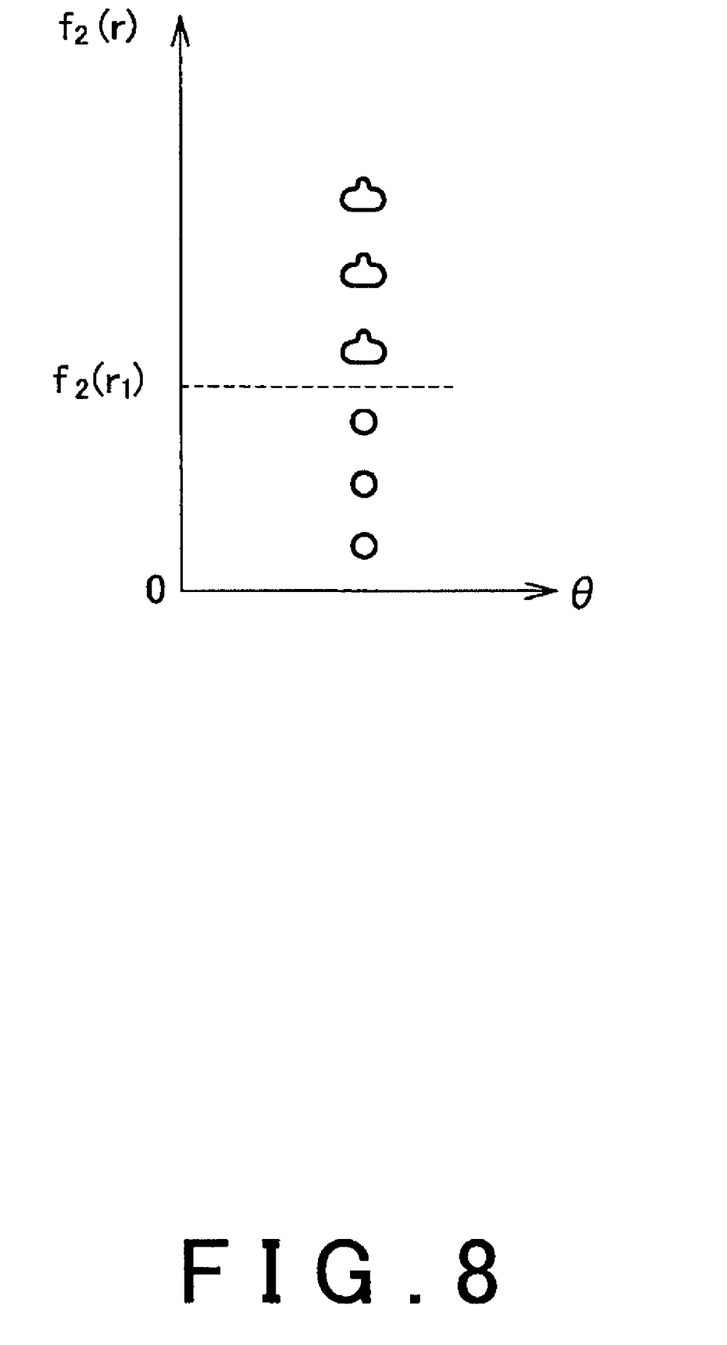
FIG. 8 shows another example of shapes of a light spread after the coordinate conversion is performed.

FIG. 8 shows another example of shapes of a light spread after the coordinate conversion is performed. The example of FIG. 8 shows the shape of the spread resulting from a prescribed function $f_2$ described in relation to FIG. 7. As shown in FIG. 8, the shape of the light spread remains substantially uniform within a region below $f_2(r_1)$, and also remains substantially uniform in the region greater than $f_2(r_1)$. As described in relation to FIG. 7, $r_1$ can be a value of approximately 0.6750 mm.

As described above, the image generating section 160 can modify the captured image having a pixel arrangement expressed in a Cartesian coordinate system, such that the light spread by the lens system 110 has a spatial shape that is substantially uniform. The image generating section 160 then generates the converted image by performing the conversion to a rotary coordinate system that entails an expansion or contraction in the radial direction. The coordinate conversion determining section 170 can determine the coordinate conversion for each partial region.

The correcting section 140 corrects the image in each of the plurality of partial regions in the converted image, based on the light spread modified to have a substantially uniform shape. Therefore, the number of inverse filters that are applied can be drastically reduced compared to a case where the coordinate conversion is not performed. If possible, the coordinate conversion determining section 170 may determine, for each of the plurality of partial regions in the captured image, a coordinate conversion that modifies the light spread by the lens system 110 to have a substantially uniform shape over the entire image surface. In this case, the correcting section 140 can correct all of the regions of the converted image based on the light spread modified to have a substantially uniform shape. Furthermore, in this case, the computation time can be decreased because all regions of the converted image are restored using the same inverse filter.

As described above, the shape of the light spread in the radial direction can be converted to have a substantially uniform shape by the rotary coordinate conversion. Therefore, when the lens system 110 is provided, it should be provided such that the rotational conversion around the optical axis results in a spread having a similar shape. Therefore, it is very easy to design the lens system 110.

Figure 9:
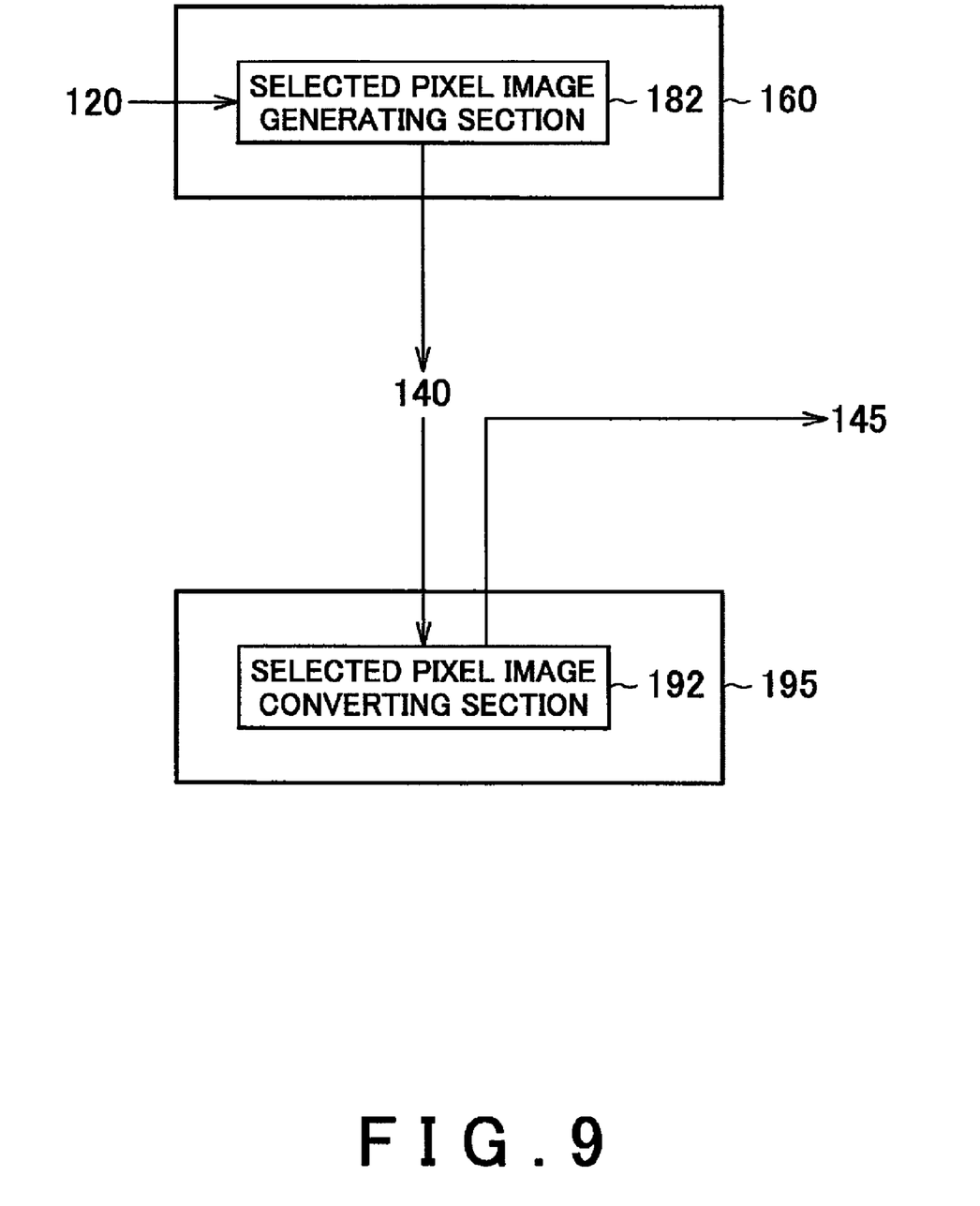
FIG. 9 shows another exemplary block configuration of the image generating section 160 and the image converting section 195.

FIG. 9 shows another exemplary block configuration of the image generating section 160 and the image converting section 195. The image generating section 160 includes a selected pixel image generating section 182. The image converting section 195 includes a selected pixel image converting section 192. Except for the image generating section 160 and the image converting section 195, the components included in the image capturing apparatus 100 have the same function and operation as the components described in relation to FIGS. 1 to 8, and therefore the following description includes only differing points.

Figure 10:
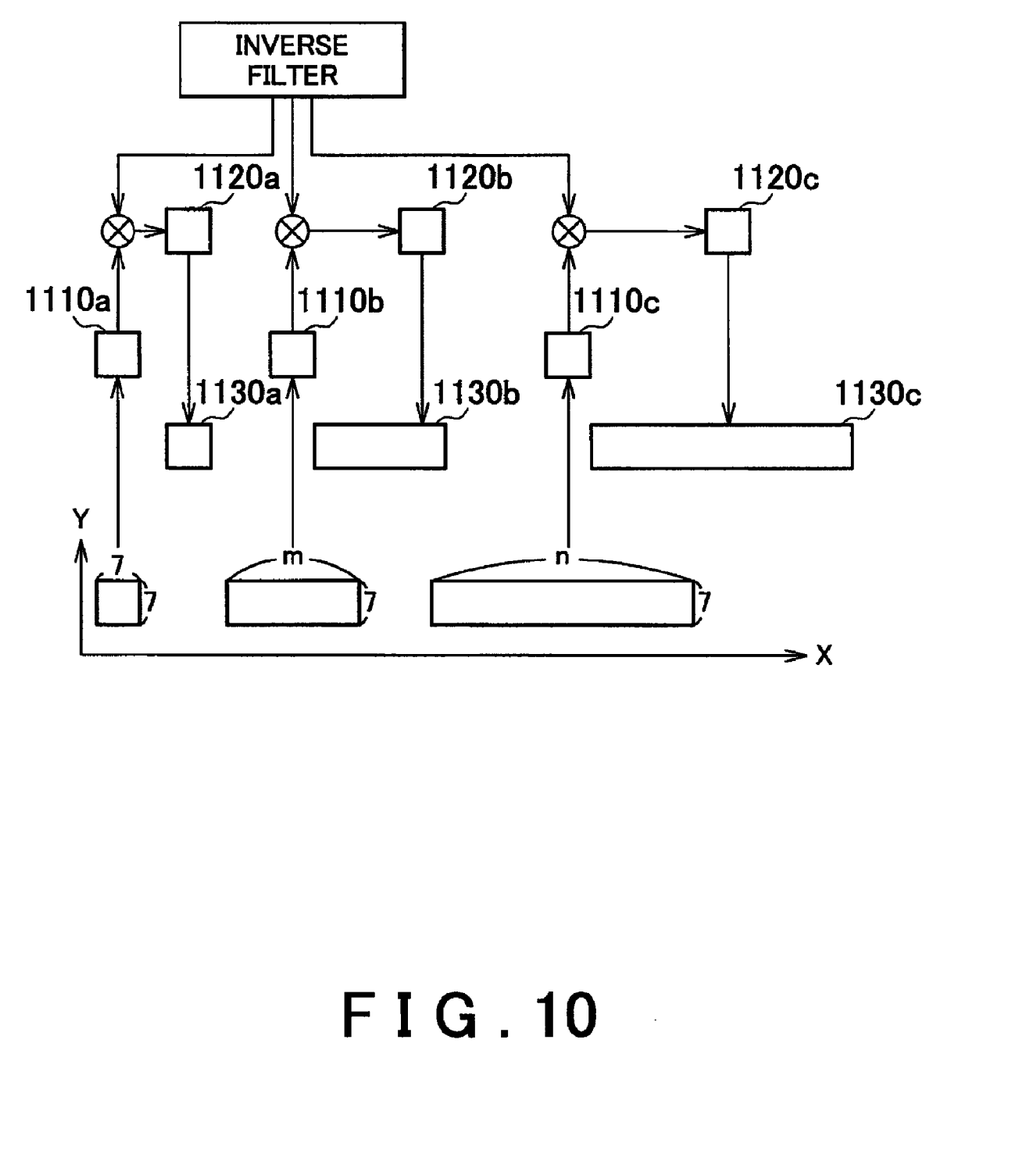
FIG. 10 shows an exemplary operation flow of the selected pixel image generating section 182, the correcting section 140, and the selected pixel image converting section 192.

FIG. 10 shows an exemplary operation flow of the selected pixel image generating section 182, the correcting section 140, and the selected pixel image converting section 192. For ease of explanation, the following description assumes that the light spread by the lens system 110 changes in the x-direction according to the image height in the x-direction. More specifically, the light spread by the lens system 110 increases in the x-direction as the image height increases in the x-direction.

In the following description, the correcting section 140 applies the correction process using the inverse filter to pixel block units of 7 by 7 pixels. In FIG. 10, the x-axis and the y-axis represent coordinate axes of a surface on which a plurality of light receiving elements of the light receiving section 120 are arranged. The light receiving elements are arranged at equal intervals in the x and y directions.

The selected pixel image generating section 182 selects each 7 by 7 block of light receiving elements from among the light receiving element blocks formed by light receiving elements at different positions, reads the output of the selected block, and generates image blocks 1110*a*, 1110*b*, and 1110*c* containing 7 by 7 pixels from the pixel values corresponding to the read output. For example, the selected pixel image generating section 182 generates the image block 1110*a* by arranging, at prescribed intervals in the order in which each light receiving element is arranged, the pixel values corresponding to the output of a block of 7 by 7 light receiving elements arranged near the optical axis.

The selected pixel image generating section 182 then selects 7 by 7 light receiving elements from a block of m by 7 light receiving elements positioned further from the aforementioned block of 7 by 7 light receiving elements in the x-direction, reads the output of the selected light receiving elements, and generates the image block 1110*b* by arranging, at prescribed intervals in the order in which each light receiving element is arranged, the pixel values corresponding to the read output. In the same manner, the selected pixel image generating section 182 selects 7 by 7 light receiving elements from a group of n by 7 light receiving elements positioned further from the group of m by 7 light receiving elements in the x-direction, reads the output of the selected light receiving elements, and generates the image block 1110*c* by arranging, at prescribed intervals in the order in which each light receiving element is arranged, the pixel values corresponding to the read output. The image formed by the plurality of image blocks 1110 corresponds to a "selected pixel image" in the present invention.

As shown in FIG. 10, 7<m<n, and the sizes of the 7 by 7, the m by 7, and the n by 7 blocks of light receiving elements corresponds to the size of the light spread at the respective positions of these blocks. Accordingly, the selected pixel image is formed from the pixel values of the selected light receiving elements with densities that are inversely proportional to the size of the light spread by the lens system 110.

In this way, the selected pixel image generating section 182 generates the selected pixel image in which the pixel values of the portion of the selected light receiving elements having a density corresponding to the light spread by the lens system 110 are arranged such that the size of the spread remains substantially uniform over the entire image. More specifically, the selected pixel image generating section 182 generates the selected pixel image from the pixel values of the portion of light receiving elements selected at lower densities for greater spreads. In this way, the pixel values in the selected pixel image that form the image of the object point are substantially constant regardless of the image height, and therefore the image of the object point is constant regardless of the image height.

The correcting section 140 applies the same reverse filter to each of the image blocks 1110*a*, 1110*b*, and 1110*c* to generate the corrected image block 1120*a*, the corrected image block 1120*b*, and the corrected image block 1120*c*, each having 7 by 7 pixels. The image formed by the plurality of corrected image blocks 1120 corresponds to a "corrected selected pixel image" in the present invention. In the manner described above, the correcting section 140 corrects the selected pixel image based on the spread in the selected pixel image.

The selected pixel image converting section 192 converts the corrected image block 1120*a*, the corrected image block 1120*b*, and the corrected image block 1120*c* into the actual image block 1130*a*, the actual image block 1130*b*, and the actual image block 1130*c*, which each have a size corresponding to the positions of the light receiving elements selected by the selected pixel image generating section 182.

For example, since the image block 1110*a* is an image obtained from the block of 7 by 7 light receiving elements, the selected pixel image converting section 192 generates the corrected image block 1120*a* as the actual image block 1130*a*. Since the image block 1110*b* is an image corresponding to the block of m by 7 light receiving elements, the selected pixel image converting section 192 converts the corrected image block 1120*b* into the actual image block 1130*b* with a size, e.g. number of pixels, corresponding to the size of the m by 7 block of light receiving elements. Similarly, since the image block 1110*c* is an image corresponding to the block of n by 7 light receiving elements, the selected pixel image converting section 192 converts the corrected image block 1120*c* into the actual image block 1130*c* with a size, e.g. number of pixels, corresponding to the size of the n by 7 block of light receiving elements.

The image made up of the plurality of generated actual image blocks 1130 corresponds to the "image having pixel values arranged to correspond to the arrangement of the plurality of light receiving elements" in the present invention. In the manner described above, the selected pixel image converting section 192 converts the selected pixel image corrected by the correcting section 140 into an image having pixel values arranged to correspond to the arrangement of the plurality of light receiving elements.

Since the selected pixel image generating section 182 generates the selected pixel image from the output of light receiving elements selected to have a density corresponding to the size of the light spread by the lens system 110, the correcting section 140 can restore the subject image by applying an inverse filter that restores the image blocks to have the same size, e.g. the same number of pixels. Therefore, the image capturing apparatus 100 has the flexibility to correspond to a difference caused by the image height in the shape and size of the light spread by the lens system 110, and can therefore allow a certain degree of distortion in the lens system 110. As a result, it becomes very easy to design the lens system 110.

To simply describe the operation of the selected pixel image generating section 182, the above description assumed that the selected pixel image generating section 182 generates an image block that has 7 by 7 pixels from each of the light receiving element blocks and that the correcting section 140 corrects the image of each image block. But instead of selecting 7 by 7 light emitting elements for each light receiving element block, the selected pixel image generating section 182 may select light receiving elements at sampling intervals corresponding to the size of the light spread by the lens system 110 and arrange the pixel values of the selected light receiving elements at prescribed intervals to generate one selected pixel image. After the correcting section 140 applies the correction process to each 7 by 7 pixel image block in the selected pixel image, the selected pixel image converting section 192 may generate an image whose size corresponds to the sizes of the plurality of light receiving element arrangements in the light receiving section 120, based on the corrected selected pixel image.

In the above examples, the selected pixel image generating section 182 generates the selected pixel image by selectively reading the output of a portion of the light receiving elements, but light receiving elements to which this selective reading is applied may be exemplified by CMOS light receiving elements instead. As another example, the selected pixel image generating section 182 may generate the selected pixel image by selecting the output of a portion of the light receiving elements according to the light spread by the lens system 110, from the output of a plurality of light receiving elements read in bulk. In this way, the selected pixel image generating section 182 may select the pixel values read from a portion of the light emitting elements, from among the pixel values read from the plurality of light receiving elements, and generate the selected pixel image from the selected pixel values.

Figure 11:
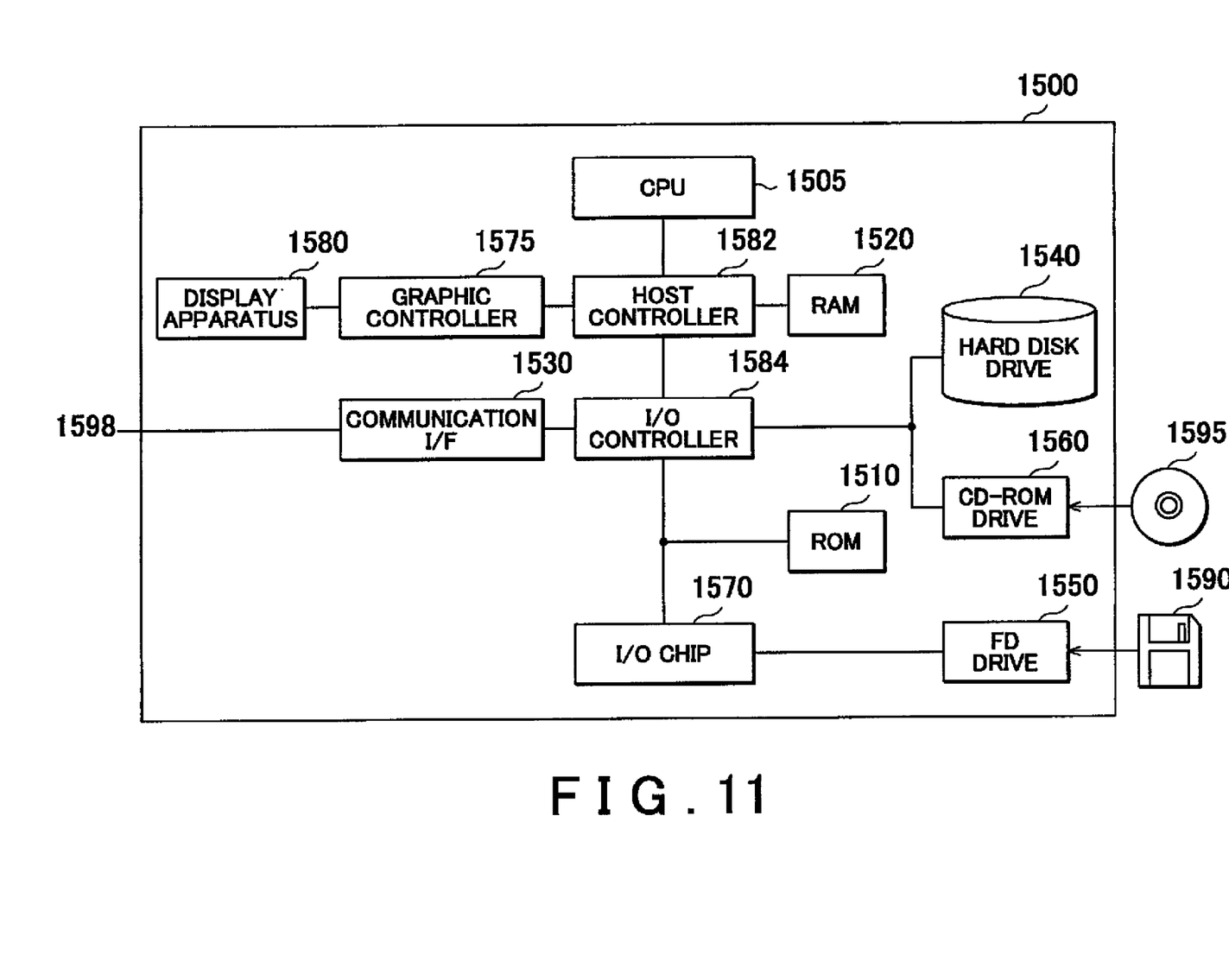
FIG. 11 shows an exemplary hardware configuration of a computer 1500 functioning as the image capturing apparatus 100.

FIG. 11 shows an exemplary hardware configuration of a computer 1500 functioning as the image capturing apparatus 100. The computer 1500 is provided with a CPU peripheral section that includes a CPU 1505, a RAM 1520, a graphic controller 1575, and a display apparatus 1580 connected to each other by a host controller 1582; an input/output section that includes a communication interface 1530, a hard disk drive 1540, and a CD-ROM drive 1560, all of which are connected to the host controller 1582 by an input/output controller 1584; and a legacy input/output section that includes a ROM 1510, a flexible disk drive 1550, and an input/output chip 1570, all of which are connected to the input/output controller 1584.

The host controller 1582 is connected to the RAM 1520 and is also connected to the CPU 1505 and graphic controller 1575 accessing the RAM 1520 at a high transfer rate. The CPU 1505 operates to control each section based on programs stored in the ROM 1510 and the RAM 1520. The graphic controller 1575 acquires image data generated by the CPU 1505 or the like on a frame buffer disposed inside the RAM 1520 and displays the image data in the display apparatus 1580. In addition, the graphic controller 1575 may internally include the frame buffer storing the image data generated by the CPU 1505 or the like.

The input/output controller 1584 connects the hard disk drive 1540, the communication interface 1530 serving as a relatively high speed input/output apparatus, and the CD-ROM drive 1560 to the host controller 1582. The hard disk drive 1540 stores the programs and data used by the CPU 1505. The communication interface 1530 is connected to a network communication apparatus 1598 and receives the programs or the data. The CD-ROM drive 1560 reads the programs and data from a CD-ROM 1595 and provides the read information to the hard disk drive 1540 and the communication interface 1530 via the RAM 1520.

Furthermore, the input/output controller 1584 is connected to the ROM 1510, and is also connected to the flexible disk drive 1550 and the input/output chip 1570 serving as a relatively high speed input/output apparatus. The ROM 1510 stores a boot program performed when the computer 1500 starts up, a program relying on the hardware of the computer 1500, and the like. The flexible disk drive 1550 reads programs or data from a flexible disk 1590 and supplies the read information to the hard disk drive 1540 and the communication interface 1530 via the RAM 1520. The input/output chip 1570 connects the flexible disk drive 1550 to each of the input/output apparatuses via, for example, a parallel port, a serial port, a keyboard port, a mouse port, or the like.

The programs performed by the CPU 1505 are stored on a recording medium such as the flexible disk 1590, the CD-ROM 1595, or an IC card and are provided by the user. The programs stored on the recording medium may be compressed or uncompressed. The programs are installed on the hard disk drive 1540 from the recording medium, are read by the RAM 1520, and are performed by the CPU 1505. The programs performed by the CPU 1505 cause the computer 1500 to function as the image generating section 160, the correcting section 140, the inverse converting section 190, the image processing section 145, and the output section 150 described in relation to FIGS. 1 to 10.

The programs shown above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to the Internet or a specialized communication network may be used as the storage medium and the programs may be provided to the computer 1500 via the network. In this way, the computer 1500, e.g. an electrical information processing apparatus, controlled by the program, can function as the image capturing apparatus 100.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An image processing apparatus, comprising:
    an image generating section that generates a converted image by performing a coordinate conversion on a captured image captured through an optical system, such that a spread of light from the optical system has a shape that is spatially substantially uniform;
    a correcting section that corrects the converted image based on the spread of the light modified by the image generating section to have the shape that is substantially uniform; and
    an inverse converting section that performs an inverse conversion of the coordinate conversion on the converted image corrected by the correcting section.

2. The image processing apparatus according to claim 1, wherein the image generating section includes:
    a coordinate conversion determining section that determines a coordinate conversion which modifies the spread of the light by the optical system to have the shape that is spatially substantially uniform, for each of a plurality of partial regions in the captured image; and
    a converted image generating section that generates the converted image by performing the coordinate conversion determined by the coordinate conversion determining section on each of the plurality of partial regions in the captured image, and
    the correcting section corrects images of the plurality of partial regions in the converted image based on the spread of the light modified to have the shape that is substantially uniform.

3. The image processing apparatus according to claim 2, wherein
    the coordinate conversion determining section determines, for each of the plurality of partial regions in the captured image, a coordinate conversion that modifies the spread of the light by the optical system to have a shape that is substantially uniform over an entire image surface, and
    the correcting section corrects all of the regions of the converted image based on the spread of the light modified to have the shape that is substantially uniform.

4. The image processing apparatus according to claim 1, wherein
    the image generating section performs a coordinate conversion on the captured image expressed in a Cartesian coordinate system to express the captured image in a rotary coordinate system, the coordinate conversion modifying the spread of the light by the optical system to have the shape that is spatially substantially uniform and entailing at least one of an expansion or a compression in a radial direction.

5. An image processing method, comprising:
    generating a converted image by performing a coordinate conversion on a captured image captured through an optical system, such that a spread of light from the optical system is modified to have a shape that is spatially substantially uniform;
    correcting the converted image based on the spread of the light modified to have a shape that is substantially uniform; and
    performing an inverse conversion of the coordinate conversion on the corrected converted image.

6. A computer readable medium storing thereon a program used by an image processing apparatus, the program causing a computer to function as:
    an image generating section that generates a converted image by performing a coordinate conversion on a captured image captured through an optical system, such that a spread of light from the optical system has a shape that is spatially substantially uniform;
    a correcting section that corrects the converted image based on the spread of the light modified to have a shape that is substantially uniform; and
    an inverse converting section that performs an inverse conversion of the coordinate conversion on the converted image corrected by the correcting section.

7. An image capturing apparatus, comprising:
    an optical system that forms an image with light and that causes a spread of light from object points at different positions to have different shapes on an image surface;
    an image generating section that generates a converted image by performing a coordinate conversion on a captured image captured through the optical system, such that the spread of the light form the optical system has a shape that is spatially substantially uniform;
    a correcting section that corrects the converted image based on the spread of the light modified to have the shape that is substantially uniform; and
    an inverse converting section that performs an inverse conversion of the coordinate conversion on the converted image corrected by the correcting section.

8. The image capturing apparatus according to claim 7, wherein
    the optical system spreads light from object points forming an image in a vicinity of a single image point to have a shape that is substantially uniform regardless of distances of the object points, and causes an optical transfer function to be substantially uniform with respect to the light from the object points forming the image in the vicinity of the single image point, and
    the shape of the spread of the light from the object points by the optical system is different depending on a position of the focal point.

9. The image capturing apparatus according to claim 8, wherein
    the shape of the spread of the light by the optical system differs radially around an optical axis,
    the image generating section generates the converted image by performing a coordinate conversion on the captured image expressed in a Cartesian coordinate system to express the captured image in a rotary coordinate system, the coordinate conversion modifying the spread of the light by the optical system to have the shape that is spatially substantially uniform and entailing at least one of an expansion or a compression in a radial direction.

10. An image capturing apparatus, comprising:
    a plurality of light receiving elements that receive light passed through an optical system;
    a selected pixel image generating section that generates a selected pixel image in which pixel values of a portion of the light receiving elements selected from among the plurality of light receiving elements to have a density corresponding to the spread of the light by the optical system are arranged such that the spread has a substantially uniform size in an image;
    a correcting section that corrects the selected pixel image based on the spread in the selected pixel image; and a selected pixel image converting section that converts the selected pixel image corrected by the correcting section into an image having pixel values in an arrangement corresponding to an arrangement of the plurality of light receiving elements; and wherein the selected pixel image generating section generates the selected pixel image from pixel values of the portion of light receiving elements, which are selected to have a lower density when the spread is greater.

11. The image capturing apparatus according to claim 10, wherein
the selected pixel image generating section selectively reads the portion of light receiving elements.

12. The image capturing apparatus according to claim 10, wherein
the selected pixel image generating section selects pixel values read from the portion of light receiving elements, from among pixel values read from the plurality of light receiving elements, and generates the selected pixel image from the selected pixels.

13. An image capturing method, comprising:
receiving light passed through an optical system with a plurality of light receiving elements;
generating a selected pixel image in which pixel values of a portion of the light receiving elements selected from among the plurality of light receiving elements to have a density corresponding to the spread of the light by the optical system are arranged such that the spread has a substantially uniform size in an image;
correcting the selected pixel image based on the spread in the selected pixel image; and
converting the corrected selected pixel image into an image having pixel values in an arrangement corresponding to an arrangement of the plurality of light receiving elements;
wherein converting the corrected selected pixel generates the selected pixel image from pixel values of the portion of light receiving elements, which are selected to have a lower density when the spread is greater.

14. A computer readable medium storing thereon a program used by an image capturing apparatus including a plurality of light receiving elements that receive light passed through an optical system, the program causing a computer to function as:
a selected pixel image generating section that generates a selected pixel image in which pixel values of a portion of the light receiving elements selected from among the plurality of light receiving elements to have a density corresponding to the spread of the light by the optical system are arranged such that the spread has a substantially uniform size in an image;
a correcting section that corrects the selected pixel image based on the spread in the selected pixel image; and
a selected pixel image converting section that converts the selected pixel image corrected by the correcting section into an image having pixel values in an arrangement corresponding to an arrangement of the plurality of light receiving elements;
wherein the selected pixel image generating section generates the selected pixel image from pixel values of the portion of light receiving elements, which are selected to have a lower density when the spread is greater.

* * * * *